Aug. 5, 1930.  A. BOYNTON  1,772,036
AUTOMATIC STAGE LIFT FLOWING DEVICE
Filed Oct. 5, 1927
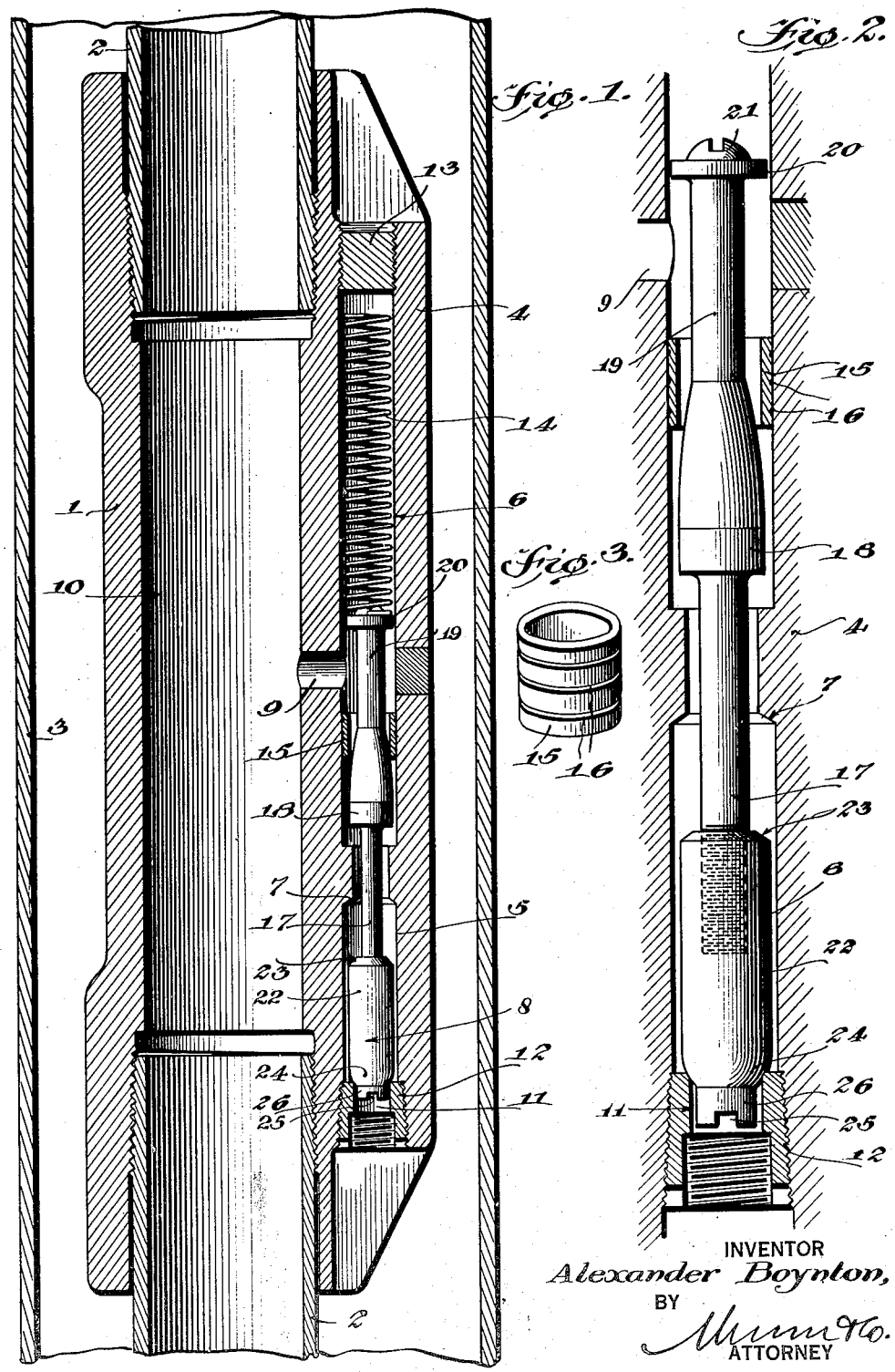
INVENTOR
Alexander Boynton,
BY
ATTORNEY Patented Aug. 5, 1930

1,772,036

UNITED STATES PATENT OFFICE

ALEXANDER BOYNTON, OF SAN ANTONIO, TEXAS

AUTOMATIC STAGE-LIFT FLOWING DEVICE

Application filed October 5, 1927. Serial No. 224,205.

An object of the invention is to provide a valve device for flowing apparatus designed to cause the elevation of liquid from the well, the novel construction of the valve device being fully developed hereinafter.

Reference is made to the accompanying drawing, in which,

Figure 1 is a sectional longitudinal section of one of the valve devices.

Fig. 2 is an enlarged detail view of the differential plunger and the parts of the valve body with which it co-acts, Fig. 3 is a detail perspective view of the throttle bushing.

The device herein disclosed is an improvement, first, on Case #2, filed May 17, 1927, Serial Number 192,049 (Figs. 13, 14 and 19), and, second, a particular improvement on the arrangement of the differential structure disclosed in Case #7, filed October 19, 1927 Serial Number 227,301.

In carrying out the invention, provision is made of a valve body 1 into the extremities of which the ends of adjoining tubing sections 2 are screwed. The valve body and tubing section constitute parts of what is known as the tubing string, this string (including the requisite number of valve devices at suitable distances apart) being suspended in the casing 3 from an appropriate casing head at the top (not shown). A lateral enlargement 4 on the valve body has chambers 5 and 6 known as valve and spring chambers by virtue of the occupancy of part of the valve device and of the spring, as described later. These chambers are connected by a reduced bore or formation, one edge of which is beveled at 7, to provide an upper seat.

Situated in the two chambers mentioned is the commonly known differential plunger 8, the structural details of which are better exemplified in Fig. 2. To this plunger is assigned the important task of controlling the passage of pressure motive fluid from one side to the other of the valve body, the mode of its government being to decrease the admission of motive fluid for the lifting effect upon the liquid as the pressure differential at opposite sides of the valve device decreases. Experimentation has demonstrated this to be a most important function in apparatus of the character under contemplation.

A horizontal port 9 marks the point of egress of motive fluid from the passage afforded by the two foregoing chambers into the conduit 10 of the valve body. The bore 11 in the hollow plug 12 at the bottom of the valve chamber 5 both marks the point of ingress of the fluid and provides a bottom seat for the valve device as well. A plug 13, of adjustable nature, provides the top bearing for the spring 14 in the spring chamber 6. This spring bears down upon the differential plunger (or valve device) and tends to establish a normal seating position upon the aforementioned bottom seat at the plug 12.

One of the important actions of the valve device is derived from its association with a relatively thin sleeve 15 (sometimes termed the throttle bushing) which is pressed into appropriate position in the lower quarter of the spring chamber 6. Use of the sleeve is merely a matter of preference for the same effect of the bushing is got by reaming out the chamber 6 and thus building up an integral cylindrical protuberance. It is observed in Fig. 3 that the sleeve has several small peripheral grooves, the purpose of these being to retain a filling of litharge, or other appropriate material, assuring a tight fit of the sleeve within the chamber when introduced, as already stated.

A relatively long and slender neck 17 has passage in the foregoing reduced bore and connects the upper and lower elements of the differential plunger respectively situated in the valve and spring chambers 5 and 6. The upper throttling element 18 is tapered in part, the smallest diameter merging with a cylindrical portion 19 which is surmounted by a base 20 upon which the foregoing spring 14 bears. The base has a slight bulge provided with a screw driver slot 21. A screw driver is used to screw the neck 17 into the lower plunger or valve element 22, the two being threadedly united.

The lower element 22 is of cylindrical formation, the upper edge being beveled at 23 for engagement with the upper seat 7. The lower end of the element is rounded at 24 and fits exactly upon the seat afforded by the inlet bore 11. A screw driver slot 25 in an extension 26 of the rounded head 24 provides for grinding in of the bevel 23 upon the seat 7.

The operation is readily understood. The action of the flowing apparatus of which the valve is the important feature, depends on what is known as the pressure differential upon opposite sides of the valve device, in other words, inside and outside of the valve. Consider the condition of a superior motive fluid pressure upon the head 24 of the valve element 8. The result would be a lifting of the valve device and an introduction of said fluid into a column of liquid which is supposed to be contained by the tubing spring. Gasification of the liquid column lightens the liquid and produces an upward movement. A stage will be arrived at where the weight of the liquid column above the valve device and the back pressure thereof against said device will closely approximate the fluid pressure against the foregoing lower head.

This condition can be visualized by considering a fluid pressure of 250 lbs. and a liquid back pressure of 240 lbs. resulting in a differential of 10 lbs. (neglecting the weight of the valve device). This low differential indicates a slow movement of the liquid column, the combined back pressure of the liquid upon the valve device and the pressure of the spring 14 serving to urge the valve element 8 away from its seating engagement with the upper seat 7, permitting a fresh impulse of pressure fluid to again enliven the liquid column.

It is evident that the introduction of the pressure fluid into the liquid column will in effect lighten it so that the back pressure upon the valve device will be diminishingly 239, 238, 237, etc., lbs. As this differential increases, the fluid pressure exerted upon the lower end of the valve device causes re-compression of the spring 14 and a gradual introduction of the tapering throttling element 18 into the sleeve 15.

The taper of the throttling element 18 restricts the volume of by-passing fluid as the increasing differential causes the valve device to rise and compress the spring. It is essential that the foregoing taper must act faster than the increasing pressure, that is to say, the taper must be such that the increasing pressure will force a constantly diminishing volume of pressure fluid through the space between the tapered throttling element 18 and the throttle bushing or sleeve 15.

As a result of all this, the greatest volume of pressure fluid is admitted at a low differential at which time the valve device is at what might be described as an unseated position in respect to its upper and lower seats and the throttling element assumes an open position in respect to the sleeve 15. A complete seal-off is obtained at a high pressure differential when the bevelled edge 23 is held against the upper seat 7 by the superior external fluid pressure.

The resulting acceleration of the liquid column is marked and accompanied by a rising pressure differential, and as the pressure differential increases the action of the motive fluid in the casing 3 is such as to elevate the differential plunger or valve element 18 within its passage, and against the tension of the spring 14, not only to approach a seating position upon the seat 7 but previously to that restrict the passage of motive fluid by virtue of the relative riding of the tapering upper element 18 in respect to the fixed throttle bushing 15.

The present arrangement of differential plunger is designed to overcome the somewhat irregular action of the tapered portion of the plunger in respect to the throttle bushing when the two latter are located at a point below the plunger seat 7. This irregular action is eliminated, and the throttling means works with greater accuracy and effectiveness, when located above the sealing-off connection at the seat 7. It is this re-arrangement of the differential plunger that constitutes the specific improvement herein disclosed.

In conclusion, it may be explained that the particular design of valve device in Fig. 1 operates according to the tubing method of raising liquid. A re-arrangement of the intake and outlet ports 11 and 9 will permit operation according to the casing method, and inasmuch as that re-arrangement as well as the description of the casing method runs through a number of prior applications, including the two specifically mentioned, it is deemed unnecessary to repeat the description of what the reader undoubtedly has in mind already.

I claim:—

1. Flowing apparatus for wells comprising a valve body having a passage affording communication between the interior and exterior and having a seat formation, a valve device operable in said passage having a valve element coacting with the seat, and throttling means constituting part of the valve device for affording a progressive regulation of by-passing motive fluid as said valve element moves in respect to its seat.

2. A valve comprising a body having a fluid passage having a restriction and seats in confronting positions at one side of the restriction, a valve device operable in the passage including an element capable of engaging either seat, and associated throttling means on the other side of the restriction for regulating the flow of fluid as the valve device approaches the respective seat.

3. A valve comprising a body having a passage containing a restriction and having confronting seats at one side of the restriction, a valve device operable in the passage including an element engageable with either seat, a throttle bushing in the passage on the other side of the restriction, and a throttling element connected with the valve element and operable in respect to the throttle bushing to regulate the volume of by-passing fluid as the valve element moves in respect to its seats.

4. A valve comprising a body having a passage for the flow of fluid, means providing confronting seats in said passage, and a valve device operable in the passage and movable in one direction therein toward one of the seats by the pressure of flowing fluid said device comprising one element which is engageable with the seats and a second element of a formation to produce a throttling effect upon the fluid at a faster rate than the pressure upon said first element increases.

5. A valve comprising a body having a passage for the flow of fluid, means in the passage providing a seat, and a valve device operable in the passage by the flow of fluid including a valve element movable toward the seat by the pressure of fluid and a throttling device for restricting the flow of fluid in the passage after movement over said valve seat at a rate faster than the increase of pressure tending to move the valve element toward the seat.

6. A valve comprising a body having a passage for the flow of fluid, means in and forming part of the passage having a seat, and a valve device in said passage comprising a valve element at one side of the seat and movable toward said seat by the pressure of fluid flowing through the passage, and a connected throttling element having a formation co-acting with a portion of the passage to restrict the volume of by-passing fluid at a rate faster than the increasing pressure acting on the valve element and tending to move the latter toward said seat.

7. A valve comprising a body having a passage for the fluid therethrough, a formation constituting part of the passage and providing a seat, a throttle bushing located in the passage at one side of said means, and a valve device in the passage comprising a valve element movable toward the seat by the pressure of fluid flowing in the passage, and a throttling element of tapering formation advancing toward said bushing as the valve element moves toward the seat to restrict the volume of by-passing fluid at a rate different from the rate at which the pressure tending to seat the valve element increases.

8. A valve comprising a body having a passage with an inlet, an outlet and an intermediate seat and a constriction in the passage at one side of the seat, and a valve device in the passage having a valve element co-acting with the seat and a throttling element reciprocable in the constriction with a plunger action.

9. A valve comprising a body having a passage with an inlet, an outlet and an intermediate seat and a constriction in the passage at one side of the seat, and a valve device in the passage having a valve element co-acting with the seat and a throttling element of tapering formation reciprocable in the constriction with a plunger action.

10. A valve comprising a body having a passage with an inlet, an outlet and an intermediate seat and a constriction in the passage at one side of the seat, and a valve device in the passage having a valve element co-acting with the seat, a throttling element of tapering formation co-acting with the constriction, and means connecting said elements so that they are simultaneously reciprocable.

11. A valve comprising a body having a passage with a reduced bore dividing the passage into two chambers, and a valve device operable in the passage comprising one element in one of the chambers, and a second element in the other chamber, one of the elements having a neck extending through the reduced bore and being connected with the other element.

12. A valve comprising a body having a passage with a reduced bore dividing the passage into two chambers one of the chambers having confronting seats, and a valve device operable in the passage comprising an element in one of the chambers engageable with either seat, and a second element in the other chamber having a neck extending through said bore and having a threaded connection with the element in the first one of the chambers, and having means for driving the threaded connection and grinding the first one of the elements upon one of the seats.

13. A valve comprising a body having a chamber with a seat, a valve device having a valve element in the chamber, and a threaded neck having a screw-driver slot for both screwing said neck into a threaded opening in said element and grinding said element upon the seat.

14. Flowing apparatus for wells comprising a tubing at one side of which motive fluid pressure is applied to the surface of a liquid into which the tubing extends, and a valve device governing the passage of fluid from one side to the other of the tubing comprising an elongated and arced formation and a restriction in respect to which it is reciprocable like a plunger for progressively varying the volume of said fluid during passage as the pressure differential inside and outside of the tubing varies.

15. A valve for well flowing apparatus comprising a body having a passage and a port, a constriction fixed in the passage at one side of the port, and a valve element actuated by a fluid flow through said passage toward the port and having a plunger formation to increasingly fill the restriction and throttle the volume of by-passing fluid as a differential pressure increases at one side of the valve body.

16. A valve for well flowing apparatus comprising a body having a passage, a constriction situated in the passage, an elongated plunger operable in the passage having a tapering formation co-acting with said constriction as the plunger moves in said passage in respect to the constriction to increasingly throttle the volume of by-passing fluid as a differential pressure at one side of the valve body increases.

17. A valve for well flowing apparatus comprising a body having a passage with a seat at one end, a constriction in the passage, and a plunger movable in the passage having a head co-acting with the seat and a tapering body co-acting with the constriction as the plunger moves in the passage to diminishingly throttle the volume of by-passing fluid as a differential pressure at one side of the valve body decreases.

ALEXANDER BOYNTON.